Figure 1:
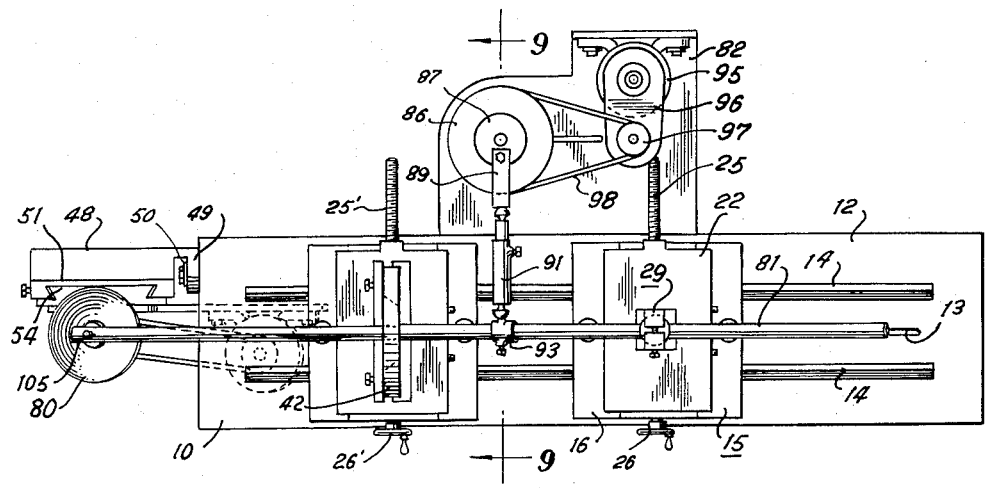

Aug. 31, 1965 T. L. FORD 3,203,138

APPARATUS FOR PRODUCING ASPHERIC SURFACES

Filed July 8, 1963 5 Sheets-Sheet 1

INVENTOR
Thomas L. Ford

BY *Schley & Schley*

ATTORNEYS

INVENTOR
Thomas L. Ford

BY *Ehley & Ehley*

ATTORNEYS

Aug. 31, 1965 T. L. FORD 3,203,138
APPARATUS FOR PRODUCING ASPHERIC SURFACES
Filed July 8, 1963 5 Sheets-Sheet 3

INVENTOR
Thomas L. Ford
BY *Ashley & Ashley*
ATTORNEYS

INVENTOR
Thomas L. Ford

BY *Shley & Shley*

ATTORNEYS

Aug. 31, 1965 T. L. FORD 3,203,138
APPARATUS FOR PRODUCING ASPHERIC SURFACES
Filed July 8, 1963 5 Sheets-Sheet 5

INVENTOR
Thomas L. Ford
BY *Ehley & Ehley*
ATTORNEYS

United States Patent Office 3,203,138
Patented Aug. 31, 1965

3,203,138
APPARATUS FOR PRODUCING ASPHERIC
SURFACES
Thomas L. Ford, Dallas, Tex., assignor to Dresser Industries, Inc., Dallas, Tex., a corporation of Delaware
Filed July 8, 1963, Ser. No. 293,338
10 Claims. (Cl. 51—58)

This invention relates to new and useful improvements in apparatus for producing aspheric surfaces.

Heretofore, the production of highly precise aspheric surfaces, such as in aspherical lenses and mirrors and the like, has required hand polishing, and has been a very slow and tedious process. The known machines which seek to produce aspheric surfaces without hand polishing are dependent upon contoured cams and various linkages which give rise to inaccuracies so that only a general approximation of the desired aspheric surface or aspheric surface of revolution has been produced. With the present invention, the precision of work is limited only by a guide member having thereon an arcuate guiding surface which may be machined and ground to extremely high accuracy, and a pivotal support, such as a ball and socket joint which also may be very accurately manufactured so as to be substantially free of lateral and endwise clearance for very positive and accurate control of the position of a surface generating assembly. In essence, the invention includes the guide member, a pivotal support, an elongate member carried in the pivotal support and engaging an arcuate guiding surface of the guide member, the elongate member carrying a surface generating assembly at one end or the other depending upon whether it is desired to produce concave or convex surfaces, together with means for causing the elongate member to move over the guiding surface of the guide member. Ellipsoid, paraboloid and hyperboloid surfaces of high accuracy and extreme precision may be produced utilizing a circular guide surface, and dependent upon the relative positioning between the guide member and the pivotal support member a wide variety of such surfaces may be produced, whereas, if noncircular guide surfaces are employed, any conceivable aspheric surface may be produced.

It is a principal object of this invention to provide improved apparatus for the production of aspheric surfaces which is extremely simple in construction with a minimum of moving parts, and with which aspheric surfaces of extreme precision may be produced without the utilization of any hand polishing operations.

A further object of the invention is to provide improved apparatus for the production of aspheric surfaces which are free of zones, or areas in which the aspheric surface does not exactly follow the curve desired.

Yet another object of the invention is to provide improved apparatus for the production of aspheric surfaces with which surfaces having a very small F ratio, or ratio of the focal length of the aspheric surface to the effective diameter of the surface, may be produced.

Still another object of the invention is to provide improved apparatus for the production of aspheric surfaces which is subject to a wide latitude of adjustments in order to produce an almost infinite variety of aspheric surfaces of widely varying degrees of curvature, size, and other optical characteristics.

Other and more particular objects will be apparent from a reading of the following description.

A construction designed to carry out the invention will be hereinafter described, together with other features of the invention.

Figure 2:
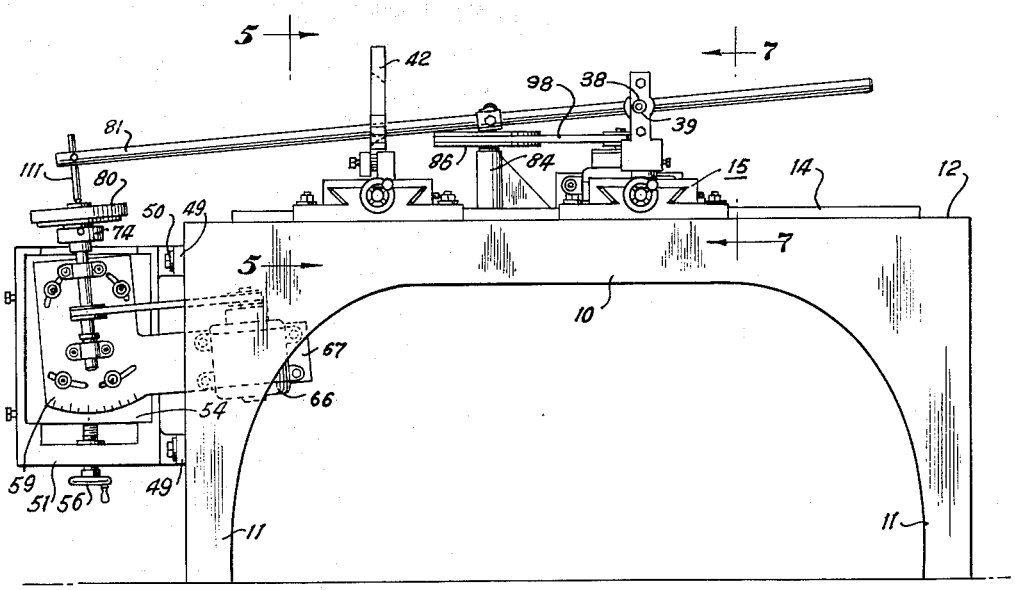
Figure 3:
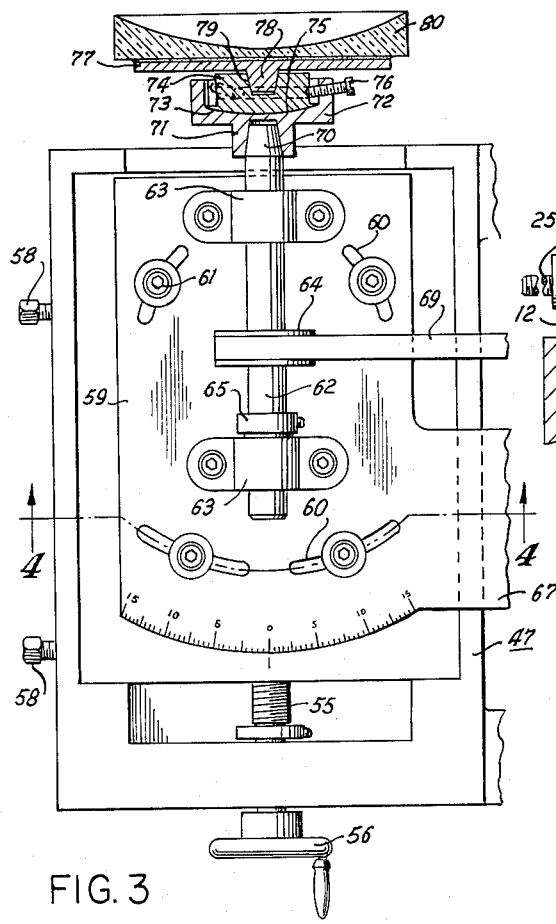
Figure 5:
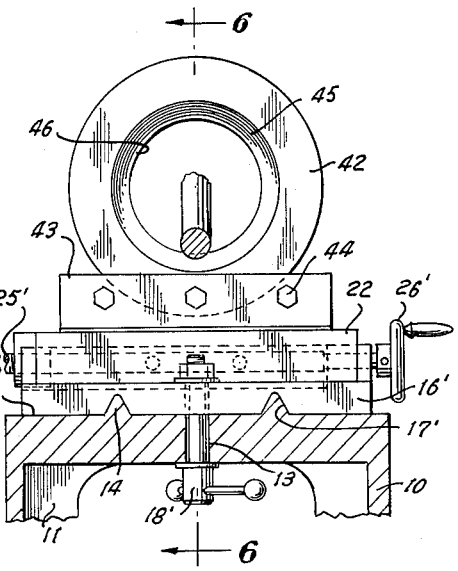
Figure 6:
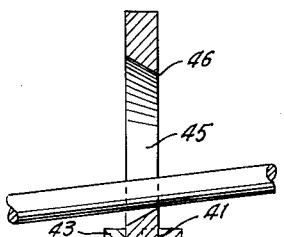
Figure 4:
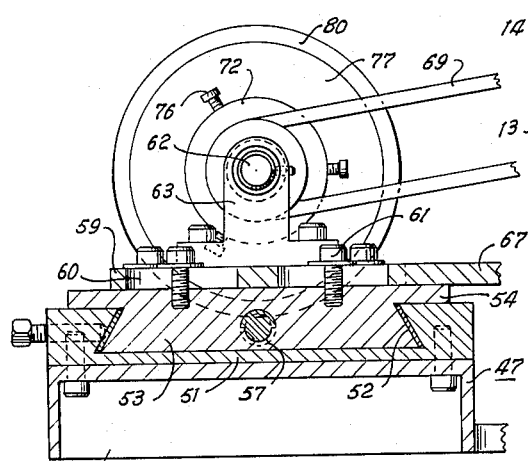
Figure 7:
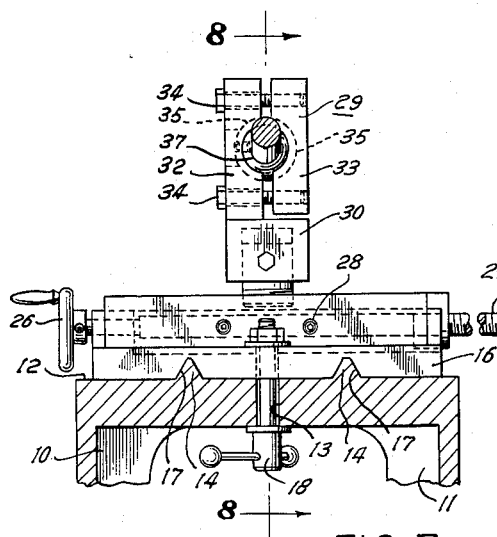
Figure 8:
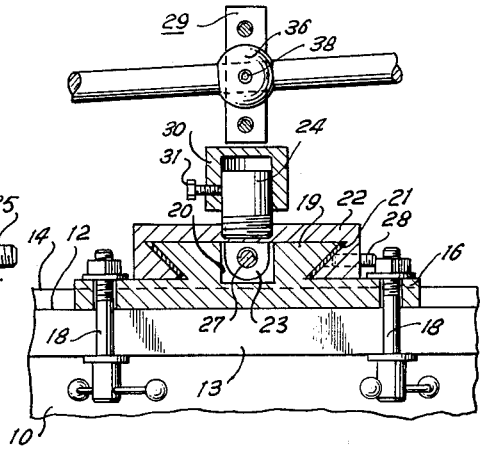
Figure 9:
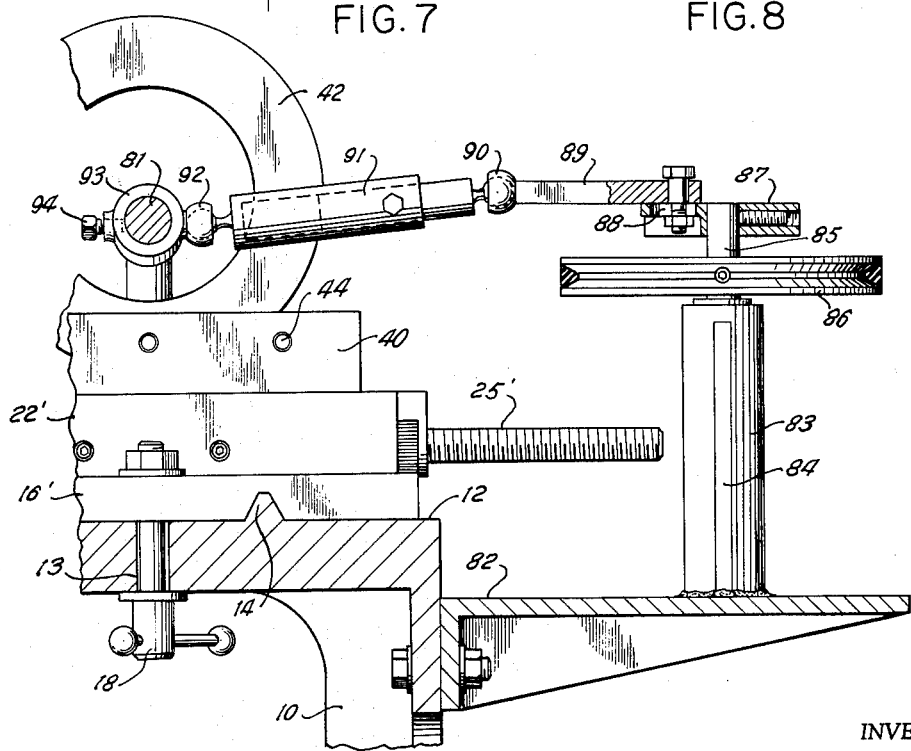
Figure 10:
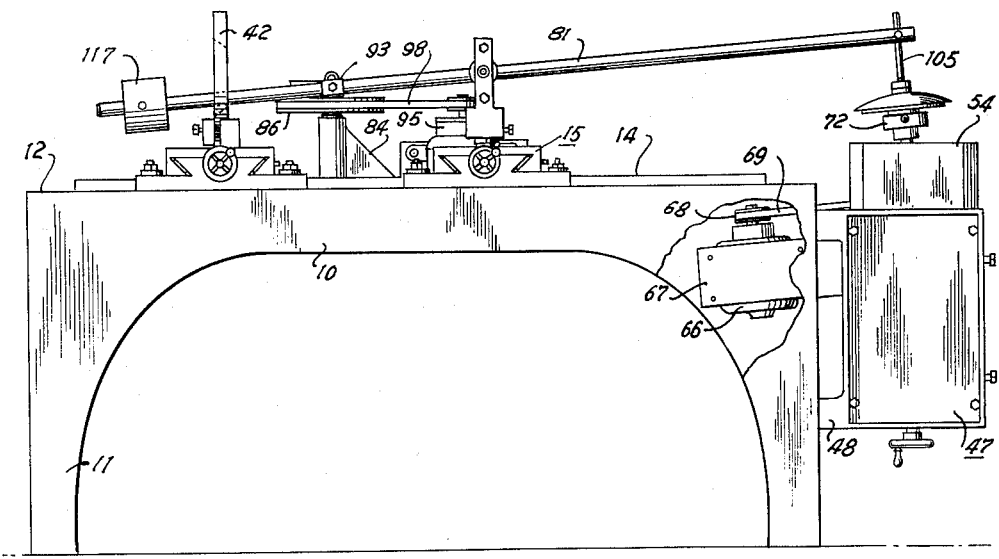
Figure 11:
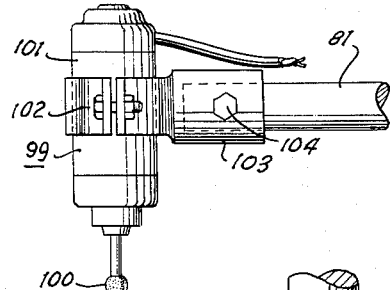
Figure 13:
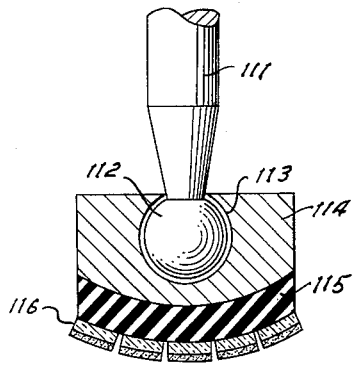
Figure 12:
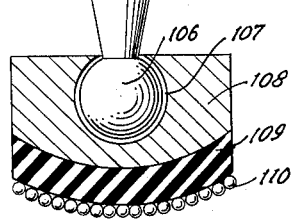
Figure 16:
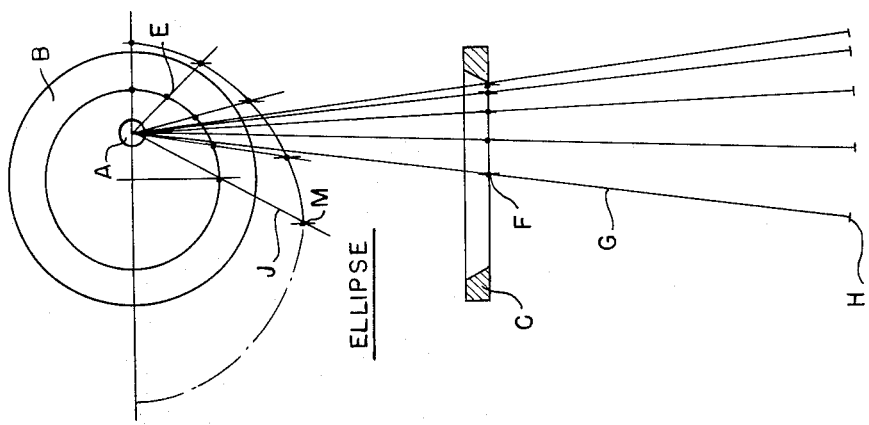
Figure 15:
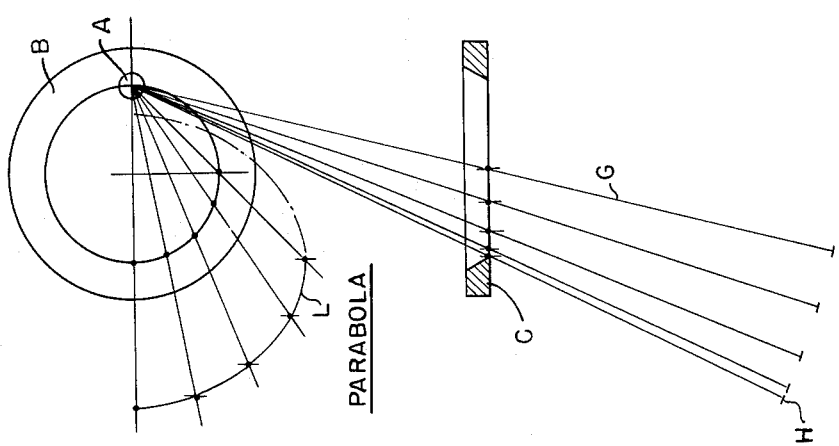
Figure 14:
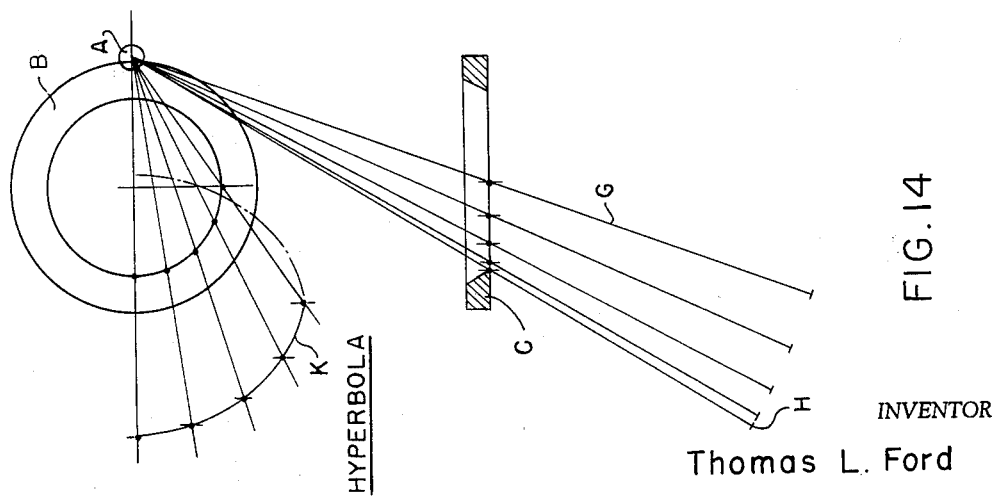

The invention will be more readily understood from a reading of the following specification and by reference to the accompanying drawings, wherein an example of the invention is shown, and wherein:

FIG. 1 is a plan view of apparatus for producing aspheric surfaces constructed in accordance with this invention, FIG. 2 is a side elevational view of the apparatus, FIG. 3 is an enlarged, fragmentary, side elevational view of the work holder, the work head being sectioned to illustrate the structure thereof, FIG. 4 is a cross-sectional view taken upon the line 4—4 of FIG. 3, FIG. 5 is a vertical, cross-sectional view taken upon the line 5—5 of FIG. 2, FIG. 6 is a vertical, sectional view taken upon the line 6—6 of FIG. 5, FIG. 7 is a vertical, cross-sectional view taken upon the line 7—7 of FIG. 2, FIG. 8 is a vertical, sectional view taken upon the line 8—8 of FIG. 7, FIG. 9 is a vertical, cross-sectional view taken upon the line 9—9 of FIG. 1, FIG. 10 is a side elevational view of the apparatus showing the parts thereof assembled for the production of convex aspheric surfaces, FIG. 11 is a side elevational view of an assembly for the rough or initial cutting of aspheric surfaces, FIG. 12 is an enlarged, fragmentary view partly in elevation and partly in section of a finish cutting head, FIG. 13 is a view similar to FIG. 12 and showing a polishing head, and FIGS. 14, 15 and 16 are diagrammatic views illustrating, respectively, how the lateral shifting of the support member with respect to the guide member causes the surface generating assembly to move in a hyperbola, a parabola and an ellipse.

In the drawings, the numeral 10 designates an elongate supporting base having legs 11, and an elongate, horizontal mounting surface 12 on its upper side. An elongate mounting slot 13 is cut longitudinally of the surface 12, and elongate guide ribs 14 of inverted V cross-sectional shape extend longitudinally of the surface 12 on each side of the slot 13.

A pivotal support member 15 is carried upon the mounting surface 12 and includes a base plate 16 having in its underside V-shaped grooves 17 which receive the ribs 14 so that the base plate 16 may be moved longitudinally along the mounting surface 12 but is accurately positioned and held against lateral movement thereon. Securing bolts 18 extend downwardly through the base plate 16 and the slot 13 for anchoring the base plate in a selected longitudinal position along the mounting surface 12.

A dovetail rib 19 extends transversely across the upper surface of the plate 16 and is provided with a central, longitudinal groove 20. Received on the rib 19 is the dovetail groove 21 in the underside of a carriage 22 having a lug 23 depending into the groove 20 and a central upstanding pin 24 projecting upwardly from its upper surface. An elongate worm screw 25, having a hand wheel 26 is journaled in the base plate 16, extending longitudinally of the groove 20 and being received in a screwthreaded opening 27 provided in the lug 23. Thus, through revolution of the screw 25 by the hand wheel 26, the carriage 22 may be shifted or adjusted laterally on the base plate 16, and locked in the selected position by set screws 28 which extend through one side of the carriage 22 into engagement with the dovetail rib 19.

A ball and socket assembly 29 is carried upon the post 24 and includes a bottom socket 30 received upon the pin 24 and locked into position thereon by a set screw or bolt 31. A first socket member 32 extends upwardly on one side of the socket 30 and has joined thereto a second socket member 33 by a pair of transverse bolts 34. Hemispherical recesses 35 formed in the adjoining faces of the elements 32 and 33 provide the socket of the assembly and receive the usual spherical ball 36 having a diametrical bore 37 and a lateral set screw 38 extending radially from the exterior of the ball 36 to the bore 32. The element 32 has an access opening 39 overlying the outer end of the set screw 38 so that the set screw may readily be tightened or loosened as desired. It is to be noted that the arrangement of the pin 24 and socket 30 is such as to permit limited vertical adjustment of the socket assembly with respect to the carriage 22 for purposes which will be discussed hereinafter.

A guide ring or guide member assembly is also carried upon the mounting surface 12 and has a base plate and carriage substantially identical to those of the pivotal support member with the exception that the carriage of the guide member assembly has a transverse upstanding flange 40. The base plate and carriage portions of the guide member assembly have been identified in the drawings by the same numerals as the corresponding portions of the pivotal support assembly with the numerals having a prime added thereto.

The transverse rib 40 has an arcuate recess 41 in one side wall having the shape of a segment of a circle and receiving the lower margin of a circular guide member or guide ring 42 which is clamped and held in the recess 41 by a suitable clamping bar 43 and securing bolts 44.

The guide member 42 is formed with an arcuate guiding surface in the form of a central, circular aperture 45 which is bevelled to form a guiding knife edge 46 and is very accurately machined and ground, desirably being formed of a very hard material, or having hard facing material applied at least to the guiding knife edge 46. The guiding surface 45 and knife edge 46 thereof may be of any desired configuration, but is preferably arcuate, and most desirably in the form of a circle or a segment of a circle. As was the case with the pivotal support member previously described, the guide ring assembly may be adjusted longitudinally over the mounting surface 12 by selective loosening and tightening of the securing bolts 18′, and the guide member 42 may also be adjusted transversely of the mounting surface 12 by lateral shifting of the carriage 22′ through loosening of the set screws 28′ and manipulation of the traversing screw 25′.

A work support assembly 47 is adapted for selective mounting upon either end of the supporting base 10 and includes an upright frame 48 having laterally extending legs 49 for securing by suitable bolts 50 to one end or the other of the base 10. A dovetail plate 51 is secured in a vertical position upon the frame 48 and is formed with a vertical, dovetail groove 52 receiving the dovetail 53 of a carriage plate 54. A vertical elevation screw 55 is rotatably mounted in the dovetail groove 52, having a hand wheel or operating handle 56 at its lower end, and is received in a screwthreaded bore 57 in the dovetail 53 for selective vertical movement and adjustment of the carriage plate 54 with respect to the frame 48 and dovetail plate 51. Suitable set screws 58 extend horizontally through one lateral face of the plate 51 for engaging the dovetail 53 and clamping the carriage 54 in a selected position.

A work support plate 59 is mounted upon the carriage 54 and is angularly adjustable thereon in a vertical plane parallel to the longitudinal axis of the base member 10, such angular adjustment being made possible by a plurality of arcuate slots 60 cut in the plate 59 and through which securing bolts 61 extend into the carriage 54. A vertical shaft 62 is rotatably mounted upon the work support plate 59 in pillow block bearings 63 and carries a driving pulley 64 between the bearings 63 and a stop ring 65 immediately above the lower bearing 63 for limiting downward movement of the shaft 62 in the bearings.

Desirably, the axis of angular adjustment of the plate 59 passes through the transverse axis of the pulley 64.

For driving the shaft 62 a suitable motor 66 is mounted upon a support arm 67 extending laterally of the plate 59 in the plane of its angular adjustment and carries a driving pulley 68 from which a driving belt 69 extends to the pulley 64 upon the shaft 62. Thus, the plate 59 and arm 67 may be angularly adjusted without affecting the shaft driving arrangement.

The upper end 70 of the shaft 62 is bevelled or tapered and is received in the depending tapered box 71 of a work adjustment cup 72 having a concave bottom 73. An adjustment block 74 having a convex lower face 75 is received in the cup 72 and centered and angularly adjusted therein by a plurality of lateral adjusting screws 76. A work support table 77 has a central depending tapered pin 78 received in a tapered recess 79 provided in the adjusting block 74, and carries a lens blank or other work object 80 as by cementing to the upper surface thereof or in any other suitable or desirable fashion.

An elongate member or bar 81 extends through the bore 37 of the ball member 36, being anchored therein by the set screw 38 and extends through the aperture of the guide ring 42 to a point overlying the work table 77 and work object 80. As will appear more fully hereinafter, a plurality of cutting, grinding, finishing and polishing assemblies may selectively be secured to the end of the member 81 for work upon the work member 80.

In the case of the generating of concave surfaces, the guide member 42 is positioned between the pivotal support member and the work object 80, as shown in FIGS. 1 and 2, whereas in the generating of convex surfaces, the pivotal support member is positioned between the guide member and the work object, as shown in FIG. 10.

For swinging the elongate member 81 pivotally in a path as determined by the relative positioning of the guide member and the pivotal support member with respect to each other and with respect to the work table or support, a bracket shelf 82 projects laterally of the supporting base 10 and carries a vertically extending bearing box 83 suitably braced by a gusset plate 84 and in which a vertical shaft 85 is rotatable. A relatively large pulley 86 is secured upon the shaft 85 immediately above the bearing 83, and a somewhat smaller eccentric member 87 is secured upon the shaft 85 above the pulley 86. The member 87 carries a radial slot 88 within which one end of a reciprocating arm 89 is adjustably secured, the arm 89 being connected through a ball and socket joint 90 and a longitudinally adjustable link 91 and second ball and socket 92 to a ring 93 surrounding the elongate member 81 and secured thereto in the desired position by a set screw 94. A motor 95 is carried upon the bracket shelf 82 and operates through suitable speed reduction means 96 a pulley 97 having a driving belt 98 by which it is connected to the pulley 86. The provision of the two universal or ball and socket joints 92 permits the elongate member 81 to swing or pivot either laterally or vertically, or a combination of the two, the adjustable connection of the arm 89 in the slot 88 allowing selection of the desired degree of eccentricity, and the adjustable link 91 making provision for the various amplitudes of movement or swinging of the elongate member 81 according to the several adjustments made to the apparatus.

A variety of cutting, grinding, finishing, polishing, and other surface generating assemblies may be moved in a controlled curve by the elongate member 81, there being shown in FIG. 11 a motor driven cutter 99 having a diamond cutter 100 for operation by the motor 101 of the assembly, the whole being mounted upon a bracket 102 carried by a socket 103 received upon the end of the elongate member 81 and fixed thereto by a suitable bolt 104. Such a cutting assembly is normally employed for rough cutting a lens or mirror blank or other work object to be formed with an aspheric surface prior to finishing and polishing thereof. A finish cutting head is shown in FIG. 12 and includes a supporting rod 105 which may be suitably secured to the end of the elongate member 81 and which carries on its lower end a spherical ball 106 rotatably received in a socket 107 in the cutting head 108 having on its lower surface a rubber pad 109 to which are fixed steel balls 110 receiving the desired cutting compound. This type of cutting head is not powered, but is free to revolve upon the ball 106 as well as rock thereupon, the cutting power being furnished through the revolving of the work table by the motor 66.

A typical polishing head is shown in FIG. 13 and includes the rod or spindle 111 having on its lower end the spherical ball 112 received in the socket 113 of the cutting head 114, there again being provided a rubber pad 115 on the lower end of the head which carries pieces of tile 116 coated with pitch in the usual fashion for precision polishing. If high preciseness of polishing is not required, felt may be employed in place of the tile 116.

All of these are conventional surface generating assemblies, and the apparatus is, of course, adaptable for use with any and all cutting, finishing and polishing units.

In the operation of the apparatus, a suitable work object, such as a lens or mirror blank is secured upon the work table 77 and properly centered and angularly adjusted with respect to the shaft 62 by the bolt 76. The guide member 42 and pivotal support member 29 are properly adjusted longitudinally upon the mounting surface 12 in accordance with the characteristics of the aspheric surface to be generated, and are also laterally adjusted in accordance with the nature of such surface. Because the surface generating assemblies carried by the elongate member 81 do not move in a vertical plane, due to the pivotal or swinging movement of the elongate member 81, the angularity of the work supporting plate 59 is accordingly adjusted. The motors 66 and 95 are now set in operation, and the dovetail carrier 54 vertically adjusted to bring the work object 80 into working or surface generating position. As the work progresses, the elevation of the carriage 54 may be accordingly adjusted, of course.

As the elongate member 81 is swung pivotally about the center of the ball 36, the movement of the surface generating assembly carried at the end thereof will be governed by the sliding engagement of the member 81 upon the knife edge 46 from the bottom dead center portion thereof, as shown in FIGS. 5 and 6 through a 90° arc laterally and upwardly, and since the work table 77 is being constantly revolved, the desired aspheric surface will be generated, dependent upon the relative longitudinal and lateral spacing of the guide member, the pivotal support member and the work table. There is substantially no looseness of fit of the guide member in the pivotal support member, and since the pivoting or swinging structure represented by the arm 89 and link 91 serve only to move the member 81 and not to control its path of movement, any accuracy of fit of the swinging or pivoting of the assembly is of no importance. The degree of accuracy of the arcuate path through which the surface generating assemblies are caused to move thus becomes dependent only upon the degree of accuracy or precision with which the knife edge 46 is machined and ground. Of course, it is desirable that the member 81 be cylindrical and circular in cross-section so long as precise mathematical curves and surfaces are to be obtained.

The relative alinement between the longitudinal axes of the guide member and pivotal support member will control the type of curve and aspheric surface obtained, and this is illustrated in FIGS. 14, 15 and 16 in which the small circles A indicate the ball 36, the letters B indicate the guide member in front elevation, and the letters C indicate the guide member in horizontal cross-section. Equally spaced points E have been marked off on one quadrant of the guide member B, and these points have been projected downwardly onto the sections C as points F. The longer lines G thus represent the relative position of the elongate member 81 which, of course, remains of constant length from the ball A to the surface generating assemblies, and the lower extremities H of the lines G thus represent the relative positions of the generating assemblies.

The shorter lines J represent endwise views of the elongate member 81 as it is moved through the several points E, and thus, by projecting upwardly from the points H to points of intersection with the lines J, the true path of movement of the cutting assemblies is determined, these curves being designated as K, L and M in FIGS. 14–16, respectively.

Thus, if the longitudinal center of the ball A is displaced laterally to a point outside the inner periphery of the guide member B, as shown in FIG. 14, the curve K will be a hyperbola, and the aspheric surface generated in this position will be a hyperboloid. If the axis of the ball A is alined with the inner periphery or knife edge of the ring B, as shown in FIG. 15, the curve L generated will be a parabola and a paraboloiid aspheric surface will be produced. If the axis of the ball A is alined at a point between the inner periphery of the ring B and the axis thereof, as shown in FIG. 16, an elliptical curve will be traced and an ellipsoid aspherical surface generated. Obviously, a very large and almost infinite variety of curves may thus be traced and corresponding aspheric surfaces generated through the relative lateral positionings of the guide member and the pivotal support member, both with respect to each other and with respect to the work table, such variety of surfaces being further greatly increased by varying the longitudinal adjustments of the two control elements, the guide member and the pivotal support member.

It is to be noted that when an elliptical surface is being formed, either lower quadrant of the guide ring may be utilized, or either upper quadrant in the case of convex surfaces. When a parabola or hyperbola is to be obtained, however, the lower or upper quadrant opposite the direction of displacement of the ball 36 or small circle A must be employed. This is as illustrated in FIGS. 14 and 15.

It is most convenient to form the guide member 42 as a complete ring due to greater ease of machining and grinding, but it is noted that the guide member need not be circular, it need not have a complete aperture but only a partial guide surface since only one quadrant is utilized, and the guide surface need not be circular. As previously noted, however, in the preferred form of the invention the guide surface is at least a segment of a circle, and most desirably, is a complete circle. Any suitable or desirable type of surface generating assembly may be employed, either the self-powered type as shown in FIG. 11, or a freely rotating and pivoting type as shown in FIGS. 12 and 13 which revolve only by reason of the fact that the work object 80 is being revolved by the motor 66. Also, as previously noted, by mere reversal of the parts as shown in FIG. 10, convex as well as concave surfaces may be generated, and again, the almost infinite variety of available surfaces remains obtainable.

It is further to be noted that in the arrangement of the apparatus illustrated in FIG. 10, a lower quadrant of the guide member is being utilized for guiding purposes, but dependent upon the relative masses of the several elements and their spacings, an upper quadrant may be employed. In the alternative, a weight member 117 may be utilized on the elongated member 81 so that a lower quadrant of the guide ring retains control of the movement of the surface generating assembly.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. Apparatus for producing aspheric surfaces including a supporting base, a guide member carried by the base and having an arcuate guiding surface, a support member rigidly carried by the base, an elongate member mounted in the support member for pivotal movement about a center in the support member, the elongate member engaging the arcuate guiding surface of the guide member and being transversely movable with respect to the guide member, a surface generating assembly carried by the elongate member at a point spaced longitudinally thereof from the guide member and the support member, and a rotatable work support juxtaposed the surface generating assembly.

2. Apparatus as set forth in claim 1 and means for swinging the elongate member pivotally in the support member.

3. Apparatus as set forth in claim 1 and means for adjusting one of the support member and the guide member with respect to the other transversely to the longitudinal axis of the elongate member.

4. Apparatus as set forth in claim 1 and means for adjusting the support member and the guide member with respect to each other transversely to the longitudinal axis of the elongate member.

5. Apparatus as set forth in claim 1 and means for adjusting the work support angularly in a plane extending through the guide member and the support member.

6. Apparatus as set forth in claim 1 wherein the supporting base is elongate, and means for adjusting the guide member and the support longitudinally of the supporting base.

7. Apparatus as set forth in claim 1 wherein the arcuate guiding surface of the guide member is a circular aperture in the guide member through which the elongate member extends and in which the elongate member is transversely movable.

8. Apparatus as set forth in claim 1 wherein the guide member is disposed between the support and the surface generating assembly.

9. Apparatus as set forth in claim 1 wherein the support is disposed between the guide member and the surface generating assembly.

10. Apparatus for producing aspheric surfaces including an elongate supporting base having an elongate mounting surface, a guide ring having therein an arcuate aperture defining an arcuate guiding surface, the guide ring being carried by the base on the mounting surface thereof and having the axis of its aperture parallel to the mounting surface, means for adjusting the guide ring longitudinally and laterally of the mounting surface, a ball and socket supporting member carried on the mounting surface of the base having the axis of its ball movable in a cone having an axis parallel to the mounting surface, means for adjusting the supporting member longitudinally and laterally of the mounting surface, an elongate cylindrical bar carried in the ball of the supporting member and extending through the aperture of the guide ring, means for adjusting the bar longitudinally in the ball of the supporting member, a surface generating assembly carried by the bar at a point spaced longitudinally from the guide ring, means for swinging the bar pivotally in the supporting member, a rotatable work support carried by one end of the supporting base juxtaposed the surface generating assembly, means for adjusting the work support away from and toward the surface generating assembly, means for adjusting the work support angularly in a plane normal to the mounting surface of the base, and means for rotating the work support.

References Cited by the Examiner
UNITED STATES PATENTS

| | | | |
|---|---|---|---|
| 1,238,612 | 8/17 | Wilson | 51—58 |
| 1,274,591 | 8/18 | Quimby | 51—131 |
| 2,276,611 | 3/42 | Connor | 51—67 |
| 2,435,126 | 1/48 | Burch | 51—58 |

J. SPENCER OVERHOLSER, *Primary Examiner.*